United States Patent
Ouellet (10) Patent No.: US 9,363,574 B1
(45) Date of Patent: Jun. 7, 2016

(54) VIDEO THROTTLING BASED ON INDIVIDUAL CLIENT DELAY

(75) Inventor: Sylvain Ouellet, Laval (CA)

(73) Assignee: VERINT AMERICAS INC., Alpharetta, GA (US)

( * ) Notice: Subject to any disclaimer, the term of this patent is extended or adjusted under 35 U.S.C. 154(b) by 1055 days.

(21) Appl. No.: 13/314,879

(22) Filed: Dec. 8, 2011

Related U.S. Application Data (60) Provisional application No. 61/421,002, filed on Dec. 8, 2010.

(51) Int. Cl.
  *G06F 15/16* (2006.01)
  *H04N 21/647* (2011.01)
  *H04N 21/2343* (2011.01)

(52) U.S. Cl.
  CPC . *H04N 21/64792* (2013.01); *H04N 21/234381* (2013.01)

(58) Field of Classification Search
  CPC ............. H04N 21/234381; H04N 21/2401; H04N 21/6405; H04N 21/64792
  USPC .......................................................... 709/235
  See application file for complete search history.

(56) References Cited

U.S. PATENT DOCUMENTS

| | | | | |
|---|---|---|---|---|
| 6,163,531 A * | 12/2000 | Kumar | ................... | H04Q 11/04 370/260 |
| 8,014,393 B1 * | 9/2011 | Faheem | .................. | H04L 47/15 370/390 |
| 2003/0005139 A1 * | 1/2003 | Colville | ............. | H04N 21/4384 709/231 |
| 2003/0061368 A1 * | 3/2003 | Chaddha | .................. | G06T 9/40 709/231 |
| 2003/0091000 A1 * | 5/2003 | Chu | ..................... | H04L 12/1827 370/230 |
| 2003/0158899 A1 * | 8/2003 | Hughes | .................. | H04N 7/181 709/205 |
| 2003/0236904 A1 * | 12/2003 | Walpole | .............. | H04L 12/1881 709/231 |
| 2005/0089035 A1 * | 4/2005 | Klemets | ............. | H04L 12/1895 370/390 |
| 2006/0126667 A1 * | 6/2006 | Smith | ................ | H04N 7/17318 370/486 |
| 2006/0200574 A1 * | 9/2006 | Pickens | ................. | H04L 12/185 709/231 |
| 2006/0242240 A1 * | 10/2006 | Parker | ................ | H04N 7/17318 709/205 |
| 2007/0005804 A1 * | 1/2007 | Rideout | .............. | H04L 12/1822 709/246 |
| 2007/0107026 A1 * | 5/2007 | Sherer | ................ | H04N 21/2668 275/97 |
| 2007/0147344 A1 * | 6/2007 | Sundqvist | ........... | H04L 12/1877 370/352 |
| 2007/0192812 A1 * | 8/2007 | Pickens | ................... | H04L 1/004 725/94 |
| 2007/0250890 A1 * | 10/2007 | Joshi | ................... | H04L 12/1877 725/120 |

(Continued)

*Primary Examiner* — Imad Hussain
(74) *Attorney, Agent, or Firm* — Meunier Carlin & Curfman (57) ABSTRACT

A communication interface is configured to send video frames of a video sequence for delivery to a plurality of clients, wherein the video frames include key frames, and to receive feedback from a delayed client of the plurality of clients indicating that the delayed client requires a slower transmission rate for the video frames. A processing system is configured to, in response to the feedback from the delayed client, direct the communication interface to send subsequent video frames to the plurality of clients except to the delayed client, determine whether the delayed client can receive a next full key frame, and if the delayed client can receive the next full key frame, direct the communication interface to resume transmission of the video sequence to the delayed client starting with the next full key frame in the subsequent video frames that are presently being sent to the other clients.

20 Claims, 5 Drawing Sheets

(56) References Cited

U.S. PATENT DOCUMENTS

| | | | |
|---|---|---|---|
| 2008/0100694 A1* | 5/2008 | Barkley | H04N 7/152 348/14.08 |
| 2008/0175273 A1* | 7/2008 | Johansson | H04N 7/17318 370/473 |
| 2009/0044242 A1* | 2/2009 | Ramakrishnan | H04N 7/162 725/118 |
| 2009/0052450 A1* | 2/2009 | Mockett | H04L 1/0009 370/390 |
| 2009/0198827 A1* | 8/2009 | Hughes | H04N 7/17318 709/231 |
| 2010/0083328 A1* | 4/2010 | Kisel | H04N 7/17318 275/109 |
| 2011/0069705 A1* | 3/2011 | Glasser | H04L 12/1836 370/390 |
| 2011/0106915 A1* | 5/2011 | Kim | H04N 21/251 709/219 |
| 2011/0209025 A1* | 8/2011 | Takahashi | H03M 13/356 714/752 |
| 2011/0302604 A1* | 12/2011 | Halen | H04L 65/4084 725/38 |
| 2011/0310217 A1* | 12/2011 | Lee | H04N 7/15 348/14.08 |
| 2013/0195168 A1* | 8/2013 | Singh | H04N 21/2187 375/240.02 |

* cited by examiner

VIDEO THROTTLING BASED ON INDIVIDUAL CLIENT DELAY

RELATED APPLICATIONS

This application claims the benefit of U.S. provisional application entitled "SYSTEM AND METHOD TO THROTTLE VIDEO BASED ON INDIVIDUAL CLIENT DELAY" having Ser. No. 61/421,002 filed on Dec. 8, 2010, which is entirely incorporated herein by reference.

TECHNICAL BACKGROUND

In the field of video analysis, software is developed and employed to process video feeds provided by video cameras or similar imaging devices in order to generate information that is useful for any of a variety of applications, such as inventory tracking, traffic analysis, and queue control. The video feeds may need to be accessed by various parties or clients in various areas or regions. Typically, a public or private communication network is used to provide the video feed to the various parties. Unfortunately, communications networks often use transmission protocols that may be undesirable for transmission of video feeds.

Overview

A method of throttling a video sequence is disclosed herein. The method comprises sending video frames of the video sequence for delivery to a plurality of clients, wherein the video frames include key frames. The method further comprises receiving feedback from a delayed client of the plurality of clients indicating that the delayed client requires a slower transmission rate for the video frames. The method further comprises, in response to the feedback from the delayed client, sending subsequent video frames to the plurality of clients except to the delayed client. The method further comprise determining whether the delayed client can receive a next full key frame. The method further comprises, if the delayed client can receive the next full key frame, resuming transmission of the video sequence to the delayed client starting with the next full key frame in the subsequent video frames that are presently being sent to the other clients.

In an embodiment, a computer-readable medium has stored thereon program instructions for throttling a video sequence, wherein the program instructions, when executed by a video source system, direct the video source system to send video frames of the video sequence for delivery to a plurality of clients, wherein the video frames include key frames. The program instructions further direct the video source system to receive feedback from a delayed client of the plurality of clients indicating that the delayed client requires a slower transmission rate for the video frames. The program instructions further direct the video source system to, in response to the feedback from the delayed client, send subsequent video frames to the plurality of clients except to the delayed client. The program instructions further direct the video source system to determine whether the delayed client can receive a next full key frame. The program instructions further direct the video source system to, if the delayed client can receive the next full key frame, resume transmission of the video sequence to the delayed client starting with the next full key frame in the subsequent video frames that are presently being sent to the other clients.

In an embodiment, a video source system comprises a communication interface and a processing system. The communication interface is configured to send video frames of the video sequence for delivery to a plurality of clients, wherein the video frames include key frames, and to receive feedback from a delayed client of the plurality of clients indicating that the delayed client requires a slower transmission rate for the video frames. The processing system is configured to, in response to the feedback from the delayed client, direct the communication interface to send subsequent video frames to the plurality of clients except to the delayed client. The processing system is further configured to determine whether the delayed client can receive a next full key frame, and if the delayed client can receive the next full key frame, direct the communication interface to resume transmission of the video sequence to the delayed client starting with the next full key frame in the subsequent video frames that are presently being sent to the other clients.

In an embodiment, sending the video frames of the video sequence for delivery to the plurality of clients comprises sending the video frames of the video sequence simultaneously for delivery to the plurality of clients.

In an embodiment, the feedback from the delayed client indicating that the delayed client requires the slower transmission rate for the video frames comprises an indication that a receive buffer in the delayed client has exceeded a capacity threshold.

In an embodiment, the feedback from the delayed client indicating that the delayed client requires the slower transmission rate for the video frames comprises an indication that the delayed client cannot process the video frames at a current transmission rate.

In an embodiment, sending the subsequent video frames to the plurality of clients except to the delayed client comprises skipping transmission of the subsequent video frames of the video sequence to the delayed client while continuing transmission of the subsequent video frames to the other clients.

In an embodiment, the feedback from the delayed client is derived from protocol information.

In an embodiment, the protocol information comprises messages received from the delayed client in a transmission control protocol.

DETAILED DESCRIPTION

The following description and associated drawings teach the best mode of the invention. For the purpose of teaching inventive principles, some conventional aspects of the best mode may be simplified or omitted. The following claims specify the scope of the invention. Some aspects of the best mode may not fall within the scope of the invention as specified by the claims. Thus, those skilled in the art will appreciate variations from the best mode that fall within the scope of the invention. Those skilled in the art will appreciate that the features described below can be combined in various ways to form multiple variations of the invention. As a result, the invention is not limited to the specific examples described below, but only by claims and their equivalents.

Certain transmission protocols are widely used in communication networks that provide video feeds or media streams to multiple clients. However, in most cases, these protocols perform flow control and retransmissions. Flow control and retransmissions are unsuitable for delivery of "live" real-time video and audio to multiple clients simultaneously because when one client of a media stream is too slow or busy, an encoder or data producer has to either block or buffer the media stream. Blocking the media stream affects all of the clients of the same data source, while buffering the media stream may be unfeasible because of limited resource or unsuitable because of the transmission delay.

Advantageously, a system and method for throttling a video sequence or media stream to an individual client is provided. In some examples, the protocol flow control is used to detect slow clients. When a slow client is detected, the slow client receives gracefully degraded media content. For example, transmission to this client may be skipped or paused until its transmission buffer can receive a complete key frame.

Figure 1:
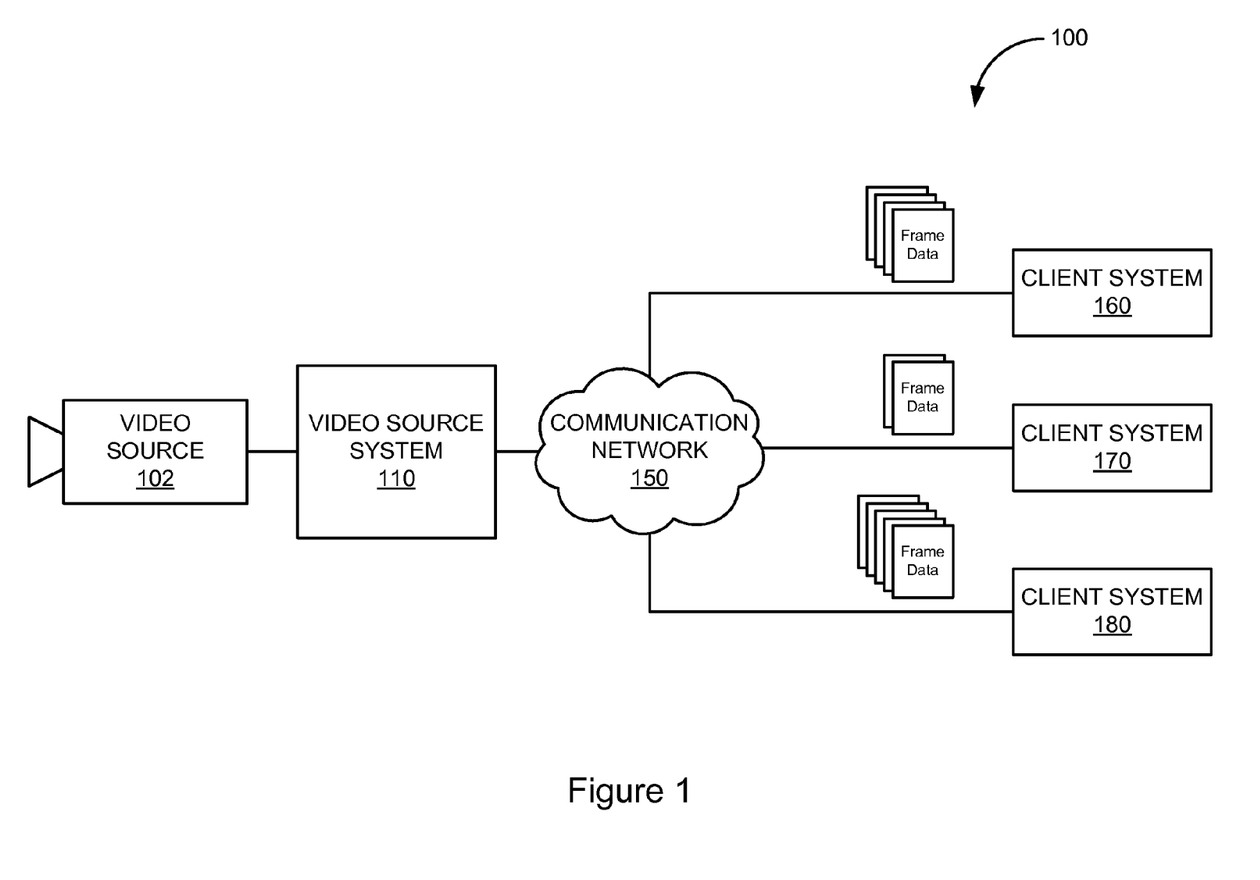
FIG. 1 is a block diagram that illustrates an example of a video system.

FIG. 1 illustrates video system 100 for throttling a video sequence or media stream to an individual client of a plurality of clients. Video system 100 includes video source 102, video source system 110, communication network 150, client system 160, client system 170, and client system 180. Video source 102 is coupled to video source system 110. Video source system 110 is coupled to communication network 150. Communication network 150 is coupled to client systems 160, 170, and 180. One video source is shown for simplicity; those skilled in the art will appreciate that video system 100 may include numerous video sources.

The connections between video source 102 and video source system 110, video source system 110 and communication network 150, and communication network 150 and client systems 160, 170, and 180 may use various communication media, such as air, metal, optical fiber, or some other signal propagation path—including combinations thereof. The connections may be direct links, or they might include various intermediate components, systems, and networks.

In operation, video source system 110 receives the video feed or media stream from video source 102. Those skilled in the art will appreciate that, in some cases, multiple video sources may provide video source system 110 with multiple video feeds simultaneously. Those skilled in art will also appreciate that while shown separately, video source system 110 may comprise one or more video sources.

Video source system 110 receives the video feed comprising video frames and sends the video frames to a plurality of clients over communication network 150. Communication network 150 may include intermediate networks, systems, or devices. Once the video feed is received, video source system 110 processes the video frames and provides the video frames to a plurality of clients over communication network 150. Client systems 160, 170, and 180 may comprise a server or any computer system capable of receiving the video frames. Client systems 160, 170, and 180 may also display the video feed for one or more operators.

Figure 2:
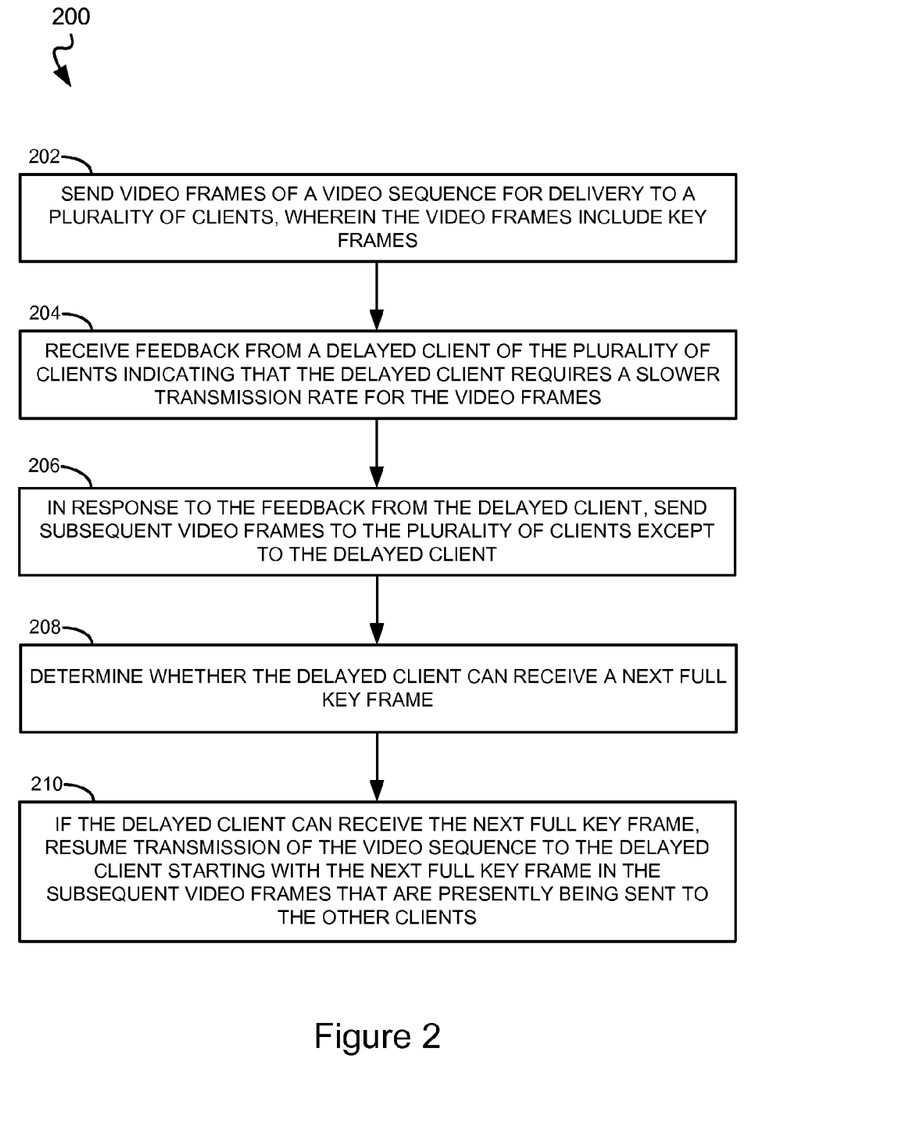
FIG. 2 is a flow diagram that illustrates an operation of a video system in an exemplary embodiment.

FIG. 2 illustrates an operation 200 of operating video system 100 for throttling a video feed transmitted to one or more of a plurality of client devices. To begin, video source 102 provides video source system 110 with a digital video feed comprising video frames. Video source system 110 receives the video feed comprising video frames and sends the video frames including key frames to a plurality of clients (202). For example, video source system 110 may send video frames to client systems 160, 170, and 180. In some examples, video source system 110 may perform operations on or otherwise process the video feed. For example, video source system 110 may compress the video feed, merge several feeds together, and/or throttle one or more of the video feeds. Those skilled in the art will appreciate that, in some examples, video source 102 can provide video source system 110 with a compressed video feed. Data compression is particularly useful in communications because it enables video source system 110 to transmit or store the same media content using fewer bits.

In a video feed or media stream, individual video frames of pictures are grouped together (called a group of pictures, or GOP) and played back so that the viewer registers the video's spatial motion. In some instances, these video frames may be compressed using standards such as, for example, the Moving Picture Experts Group (MPEG) standard. The MPEG standard includes various types of frames including predicted frames (P-frames) and intraframes (I-frames).

I-frames, also called key frames, are single frames of digital content that the compressor examines independent of the frames that precede and follow it. Each I-frame includes all of the data needed to display that frame. P-frames follow I-frames and contain only data that has changed from the preceding or forthcoming I-frame (such as color or content changes). Typically, I-frames are interspersed with P-frames (including bi-directional predictive frames or B-frames) in a compressed video. I-frames comprise more bits than P-frames, and thus take up more space on storage mediums such as transmit and/or receive buffers. In most cases, the video quality typically improves as the number of I-frames in the video stream increases. However, those skilled in the art will appreciate that additional I-frames may not result in better video quality, despite the greater number of bits comprising an I-frame relative to a P-frame.

Client systems 160, 170, and 180 can include receive buffers to store received video frames. Client systems 160, 170, and 180 can provide feedback to video source system 110 indicating that the client requires a slower transmission rate for the video frames. Thus, video source system 110 could receive feedback from a delayed client indicating that the delayed client requires a slower transmission rate for the video frames (204). For example, client system 170 and client system 160 may send feedback to video source system 110 indicating that they are delayed in receiving the video feed from video source 102. The delay may be caused because, for example, a receive buffer in the client system is at or near capacity. For example, the feedback from the delayed client could indicate that the delayed client requires a slower transmission rate for the video frames by indicating that a receive buffer in the delayed client has exceeded a capacity threshold. Alternatively or additionally, the client system may not be processing the received frames fast enough. For example, the feedback from the delayed client could indicate that the delayed client requires a slower transmission rate for the video frames by indicating that the delayed client cannot process the video frames at a current transmission rate. Those skilled in the art will appreciate that messages sent by the client may indicate the client's ability to process frames rather than its inability to process frames.

In some examples, client systems 160, 170, and 180 may not provide direct feedback to video system 110. Instead, the feedback may be derived from protocol information. For example, if communication network 150 operates using the Transmission Control Protocol (TCP) then video source system 110 may derive the feedback information based on the TCP protocol. However, as discussed, in some cases TCP may be unsuitable for delivery of "live" real-time video and audio to multiple clients because it performs flow control and retransmissions.

TCP is one of the two core protocols for transferring information over the Internet, complementing Internet Protocol (IP), and thus the entire suite is commonly referred to as TCP/IP. TCP provides the service of exchanging data directly between two network hosts. IP provides addressing and routing messages across one or more networks. More specifically, TCP provides reliable, ordered delivery of a stream of bytes from a program on one computer to another program on another computer. TCP is the typical protocol utilized by most Internet applications such as web servers that host websites that are accessible by personal computer systems and other client devices. Other applications which do not require reliable data stream service may use the User Datagram Protocol (UDP), which provides a datagram service that emphasizes reduced latency over reliability.

In some examples, the TCP flow control is used to detect slow clients. When a slow client is detected, transmission to this client is skipped until its transmission buffer can receive a complete key frame. This way, other clients are un-affected by the slow client. The slow client receives gracefully degraded media content.

Video source system 110 receives feedback from the plurality of clients indicating whether or not they are delayed. In response to the feedback from a delayed client indicating that the delayed client requires a slower transmission rate for the video frames, video source system 110 continues to send subsequent video frames to the plurality of clients except to the delayed client (206). For example, client system 170 may provide feedback via the TCP protocol indicating that a receive buffer is at or near capacity. Video source system 110 then continues to send subsequent video frames to client system 180 and client system 160. Client system 160 may subsequently provide feedback to video source system 110 indicating that it too is delayed. In this case, video source system 110 continues transmitting only to client system 180.

Video source system 110 determines whether the delayed client(s) can receive a next full key frame (208). Video source system 110 may make this determination based on the feedback received from the plurality of clients. For example, one or more of the client systems may indicate through feedback that it can now accept a full key frame. In this example, client system 170 was first delayed, followed by client system 160. Either client system 160 or 170 may indicate that it is capable of resuming reception of the video frames at any time.

If a delayed client is able to receive the next full key frame, video source system 110 resumes transmission of the video sequence to the delayed client starting with the next full key frame in the subsequent video frames that are presently being sent to the other clients (210). For example, client system 160 and/or client system 170 may clear out the contents of their receive buffers. At this point, the client systems may provide feedback indicating their ability to resume the sequence of video frames starting with the next key frame in the sequence. In this manner, video source system 110 effectively throttles back transmission of the subsequent video frames to the delayed client.

Figure 3:
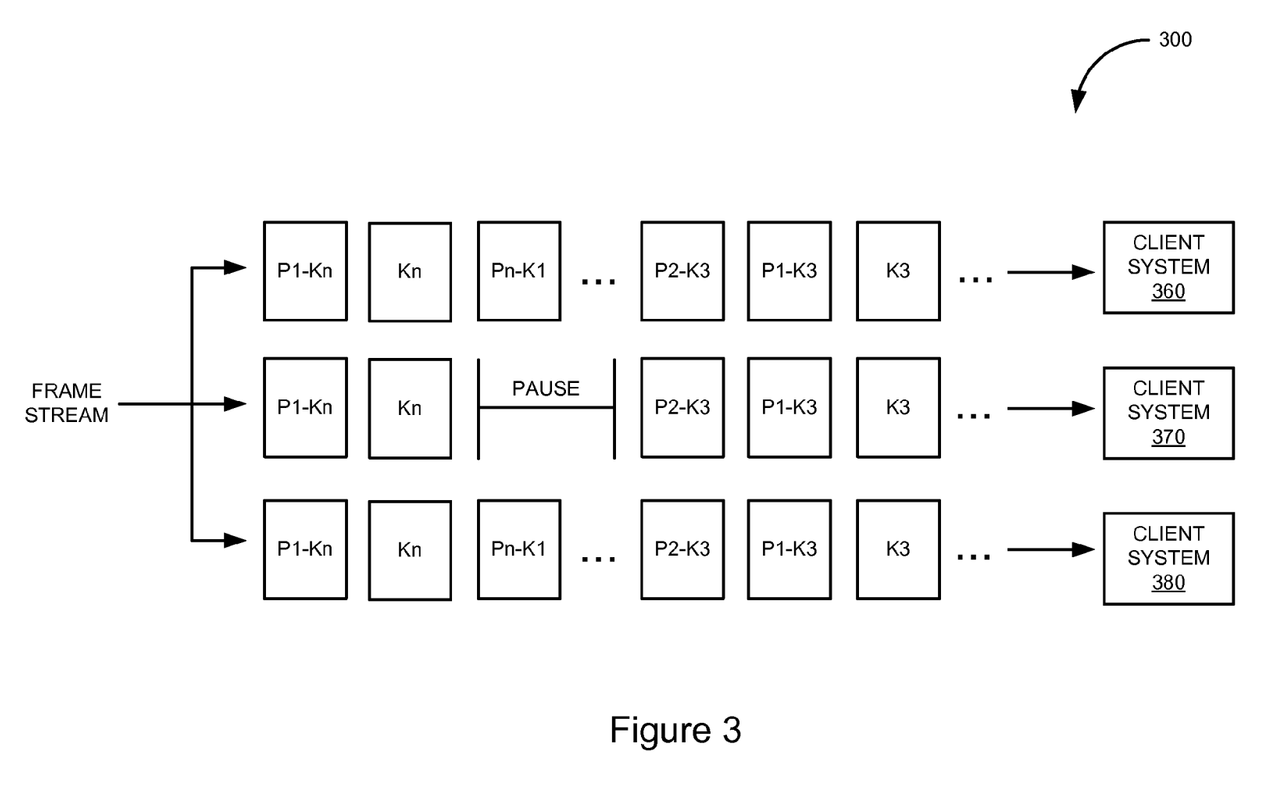
FIG. 3 is a block diagram that illustrates an operation of a video system in an exemplary embodiment.

FIG. 3 illustrates an example of operation of video system 300. In this example, a frame stream is provided to client systems 360, 370, and 380. The frame stream comprises key frames and P-frames. Key frames are designated with a "K" followed by a sequential numeral. Likewise, P-frames are designated by the letter "P" followed by a number in a sequence. Each P-frame and sequential numeral is then followed by a "-" and the associated key frame. Those skilled in the art will appreciate that video system 300 can include more frame streams and more or fewer client systems.

In this example, the sequence of video frames begins with K1 and continues until the first P-frame after the $n^{th}$ key frame, n being a variable representing the sequential numeral associated with its respective P-frame. The P-frame is denoted "P1-Kn." As shown, client systems 360, 370, and 380 have already received the first and second key frames and the associated P-frames. Client systems 360, 370, and 380 continue to receive video frames from the frame stream until client system 370 indicates through feedback that it is delayed in receiving the video frames. A video source system receives the feedback and pauses transmission of additional frames to client system 370. The video source system continues to monitor the feedback of client system 370 while providing client systems 360 and 380 with video frames from the frame stream.

When the video source system determines that client system is capable of receiving at least a full key frame, the video source system makes a note to resume transmission of the frame stream to client system 370 at the next key frame in the frame stream sequence. In this case, the frame stream transmission to client system 370 is resumed at key frame "Kn."

Figure 4:
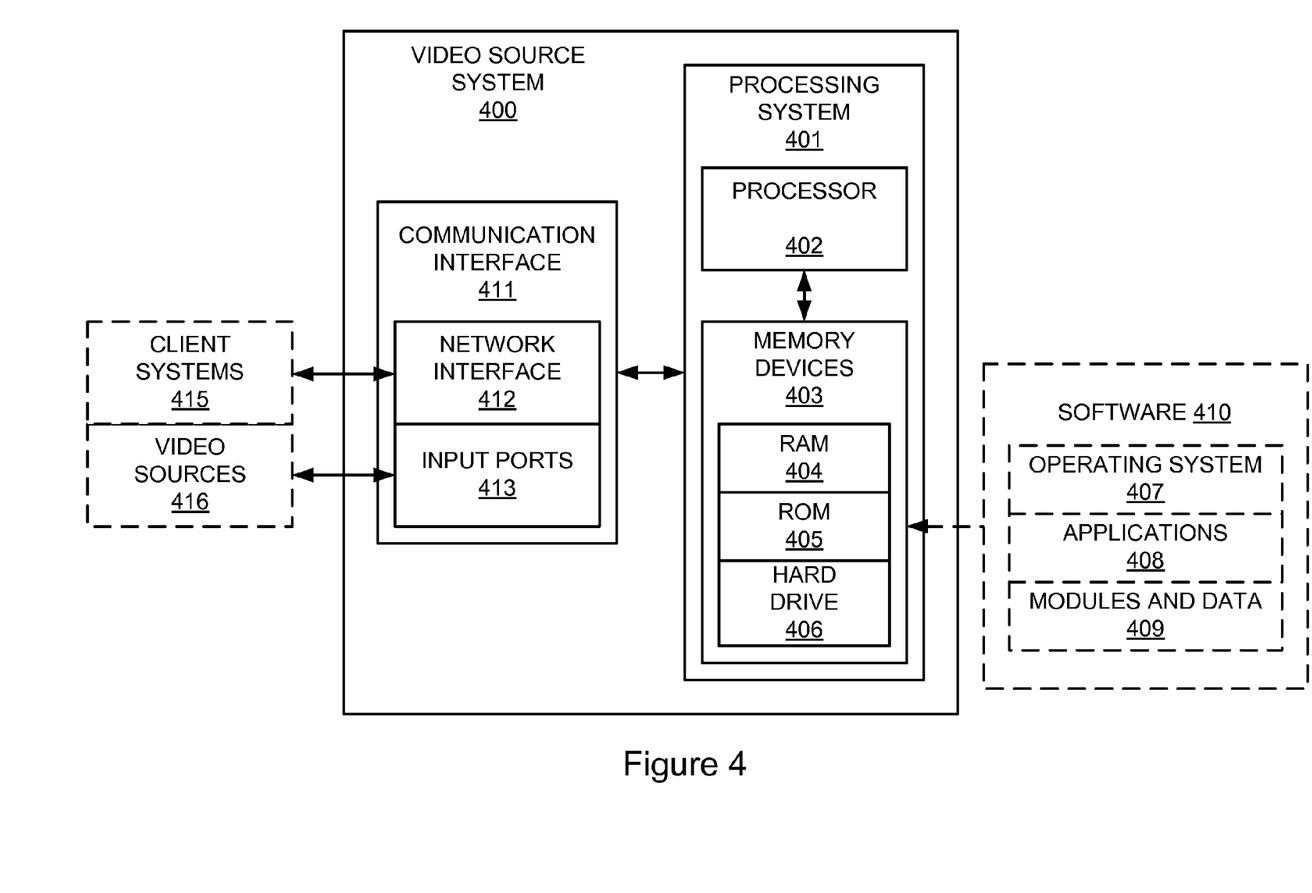
FIG. 4 is a block diagram that illustrates a video source system according to one example.

FIG. 4 illustrates an example of video source system 400, such as video source system 110 of FIG. 1. Video source system 400 includes communication interface 411 and processing system 401. Processing system 401 is linked to communication interface 411 through a bus. Processing system 401 includes a processor 402 and memory devices 403 that store operating software 410.

Communication interface 411 includes a network interface 412 and input ports 413. Communication interface 411 includes components that communicate over communication links, such as network cards, ports, radio frequency (RF) transceivers, processing circuitry and software, or some other communication devices. Communication interface 411 may be configured to communicate over metallic, wireless, or optical links. Communication interface 411 may be configured to use Time Division Multiplexing (TDM), Internet Protocol (IP), Ethernet, optical networking, wireless protocols, communication signaling, or some other communication format—including combinations thereof.

Network interface 412 is configured to connect to external devices over a communication network. In some examples, these external network devices may include video sources 416 and video storage systems. Input ports 413 are configured to connect to video sources 416. Input devices, such as a keyboard, mouse, or other user input devices may also be connected to input ports 413. If output ports are included, the output ports may be configured to connect to output devices, such as a display, a printer, or other output devices. Those skilled in the art will appreciate that, alternatively or additionally, some or all of video sources 416 may be connected to video source system 400 over a communication network via network interface 412.

Processor 402 includes a microprocessor and other circuitry that retrieves and executes operating software from the memory devices 403. Memory devices 403 include random-access memory (RAM) 404, read-only memory (ROM) 405, hard drive 406, and/or any other memory apparatus. Memory devices 403 comprise non-transitory computer readable storage media, such as disk drives, flash drives, data storage circuitry, or some other hardware memory system. Memory devices 403 may comprise a single device or could be distributed across multiple devices—including devices in different geographic areas. Memory devices 403 may be embedded in various types of equipment.

Operating software 410 includes computer programs, firmware, or some other form of machine-readable processing instructions. In this example, the operating software 410 includes an operating system 407, applications 408, and modules and data 409. The operating software 410 may include other software or data as required by any specific embodiment. When executed by the processor 402, the operating software 410 directs processing system 401 to operate video source system 400 as described herein.

Figure 5:
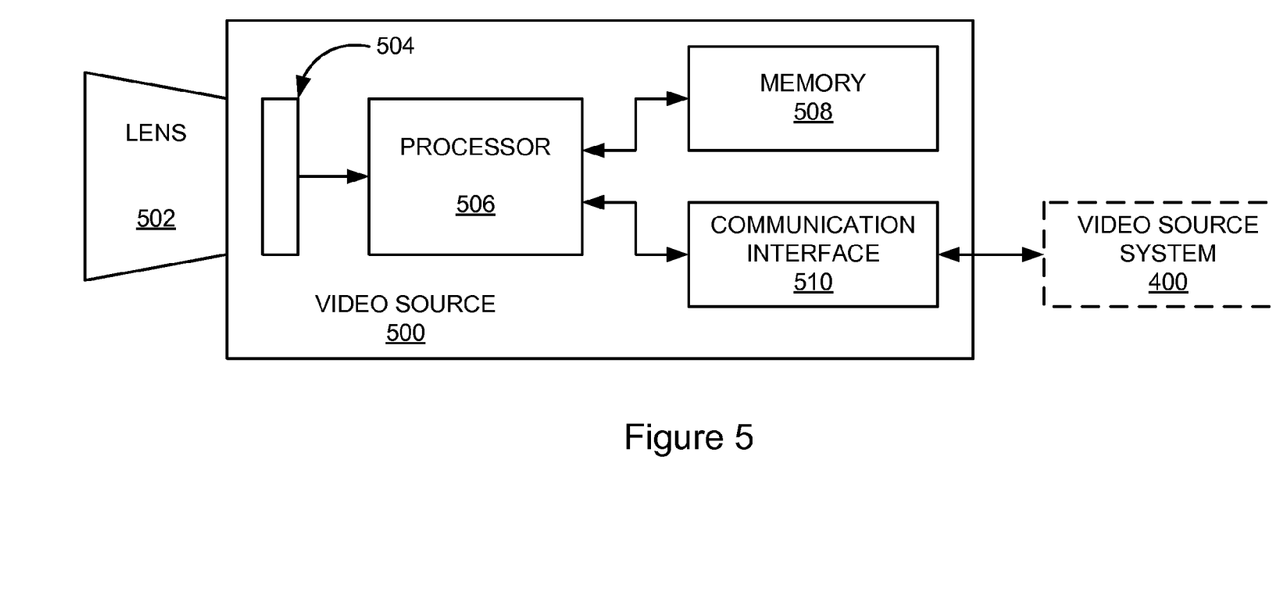
FIG. 5 is a block diagram that illustrates a video source according to one example.

FIG. 5 illustrates an example of video source 500, such as video source 102 of FIG. 1 and video sources 416 of FIG. 4. The video source 500 includes a lens 502, a sensor 504, a processor 506, memory 508, and a communication interface 510.

Lens 502 is configured to focus an image of a scene or field of view on sensor 504. Lens 502 may be any type of lens, pinhole, zone plate, or the like that is able to focus an image on sensor 504. Sensor 504 digitally captures video of the scene and passes the resulting video images to processor 506. Processor 506 is configured to store some or all of the video in memory 508. In some examples, processor 506 could be configured to process the video and send the processed video to video source system 400 of FIG. 4 via communication interface 510.

Although shown external to video source system 400, video source system 400 may comprise video source 500. Likewise, processing system 401 of video source system 400 may comprise some or all of the components and/or functionality described herein for video source 500.

The above description and associated figures teach the best mode of the invention. The following claims specify the scope of the invention. Note that some aspects of the best mode may not fall within the scope of the invention as specified by the claims. Those skilled in the art will appreciate that the features described above can be combined in various ways to form multiple variations of the invention. As a result, the invention is not limited to the specific embodiments described above, but only by the following claims and their equivalents.

What is claimed is:

1. A method of throttling a video sequence, the method comprising:
    sending video frames of the video sequence for delivery to a plurality of clients, wherein the video frames include key frames;
    receiving feedback from a delayed client of the plurality of clients indicating that the delayed client requires a slower transmission rate for the video frames;
    in response to the feedback from the delayed client, sending subsequent video frames including at least one key frame to the plurality of clients except to the delayed client;
    determining whether the delayed client can receive a next full key frame; and
    if the delayed client can receive the next full key frame, resuming transmission of the video sequence to the delayed client starting with the next full key frame in the subsequent video frames that are presently being sent to the other clients.

2. The method of claim 1 wherein sending the video frames of the video sequence for delivery to the plurality of clients comprises sending the video frames of the video sequence simultaneously for delivery to the plurality of clients.

3. The method of claim 1 wherein the feedback from the delayed client indicating that the delayed client requires the slower transmission rate for the video frames comprises an indication that a receive buffer in the delayed client has exceeded a capacity threshold.

4. The method of claim 1 wherein the feedback from the delayed client indicating that the delayed client requires the slower transmission rate for the video frames comprises an indication that the delayed client cannot process the video frames at a current transmission rate.

5. The method of claim 1 wherein sending the subsequent video frames to the plurality of clients except to the delayed client comprises skipping transmission of the subsequent video frames of the video sequence to the delayed client while continuing transmission of the subsequent video frames to the other clients.

6. The method of claim 1 wherein the feedback from the delayed client is derived from protocol information.

7. The method of claim 6 wherein the protocol information comprises messages received from the delayed client in a transmission control protocol.

8. A non-transitory computer-readable medium having program instructions stored thereon for throttling a video sequence, wherein the program instructions, when executed by a video source system, direct the video source system to:
    send video frames of the video sequence for delivery to a plurality of clients, wherein the video frames include key frames;
    receive feedback from a delayed client of the plurality of clients indicating that the delayed client requires a slower transmission rate for the video frames;
    in response to the feedback from the delayed client, send subsequent video frames including at least one key frame to the plurality of clients except to the delayed client;
    determine whether the delayed client can receive a next full key frame; and
    if the delayed client can receive the next full key frame, resume transmission of the video sequence to the delayed client starting with the next full key frame in the subsequent video frames that are presently being sent to the other clients.

9. The computer-readable medium of claim 8 wherein the program instructions, to direct the video source system to send the video frames of the video sequence for delivery to the plurality of clients, instruct the video source system to send the video frames of the video sequence simultaneously for delivery to the plurality of clients.

10. The computer-readable medium of claim 8 wherein the feedback from the delayed client indicating that the delayed client requires the slower transmission rate for the video frames comprises an indication that a receive buffer in the delayed client has exceeded a capacity threshold.

11. The computer-readable medium of claim 8 wherein the feedback from the delayed client indicating that the delayed client requires the slower transmission rate for the video frames comprises an indication that the delayed client cannot process the video frames at a current transmission rate.

12. The computer-readable medium of claim 8 wherein the program instructions, to direct the video source system to send the subsequent video frames to the plurality of clients except to the delayed client, instruct the video source system to skip transmission of the subsequent video frames of the video sequence to the delayed client while continuing transmission of the subsequent video frames to the other clients.

13. The computer-readable medium of claim 8 wherein the feedback from the delayed client is derived from protocol information.

14. The computer-readable medium of claim 13 wherein the protocol information comprises messages received from the delayed client in a transmission control protocol.

15. A video source system comprising:
- a communication interface configured to send video frames of the video sequence for delivery to a plurality of clients, wherein the video frames include key frames, and to receive feedback from a delayed client of the plurality of clients indicating that the delayed client requires a slower transmission rate for the video frames; and
- a processing system configured to, in response to the feedback from the delayed client, direct the communication interface to send subsequent video frames including at least one key frame, to the plurality of clients except to the delayed client;
- the processing system further configured to determine whether the delayed client can receive a next full key frame, and if the delayed client can receive the next full key frame, direct the communication interface to resume transmission of the video sequence to the delayed client starting with the next full key frame in the subsequent video frames that are presently being sent to the other clients.

16. The video source system of claim 15 wherein the communication interface configured to send the video frames of the video sequence for delivery to the plurality of clients comprises the communication interface configured to send the video frames of the video sequence simultaneously for delivery to the plurality of clients.

17. The video source system of claim 15 wherein the feedback from the delayed client indicating that the delayed client requires the slower transmission rate for the video frames comprises an indication that a receive buffer in the delayed client has exceeded a capacity threshold.

18. The video source system of claim 15 wherein the feedback from the delayed client indicating that the delayed client requires the slower transmission rate for the video frames comprises an indication that the delayed client cannot process the video frames at a current transmission rate.

19. The video source system of claim 15 wherein the processing system configured to direct the communication interface to send the subsequent video frames to the plurality of clients except to the delayed client comprises the processing system configured to direct the communication interface to skip transmission of the subsequent video frames of the video sequence to the delayed client while continuing transmission of the subsequent video frames to the other clients.

20. The video source system of claim 15 wherein the feedback from the delayed client is derived from protocol information.

* * * * *